(12) United States Patent
Alkhardawi

(10) Patent No.: US 12,224,573 B2
(45) Date of Patent: Feb. 11, 2025

(54) SUBMARINE CABLE SYSTEM AND A SWITCHING METHOD THEREOF

(71) Applicant: SAUDI ARABIAN OIL COMPANY, Dhahran (SA)

(72) Inventor: Wasseem Ali Alkhardawi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 248 days.

(21) Appl. No.: 18/049,937

(22) Filed: Oct. 26, 2022

(65) Prior Publication Data

US 2024/0146051 A1  May 2, 2024

(51) Int. Cl.
*H02H 11/00* (2006.01)
*H02G 9/02* (2006.01)
*H02H 7/055* (2006.01)
*H02H 7/22* (2006.01)

(52) U.S. Cl.
CPC ............. *H02H 11/008* (2013.01); *H02G 9/02* (2013.01); *H02H 7/055* (2013.01); *H02H 7/22* (2013.01)

(58) Field of Classification Search
CPC ...... H02H 11/00; H02H 11/008; H02H 7/055; H02H 7/22; H02G 9/02
USPC ......................................................... 174/37
See application file for complete search history.

(56) References Cited

U.S. PATENT DOCUMENTS

| 4,631,625 A | 12/1986 | Alexander et al. |
| 9,030,042 B2 | 5/2015 | Zhan et al. |
| 10,770,895 B2 | 9/2020 | Clarke et al. |
| 11,394,203 B2 | 7/2022 | Alkhardawi |
| 2015/0008766 A1 | 1/2015 | Boe et al. |
| 2015/0108952 A1 | 4/2015 | Moeller et al. |

(Continued)

FOREIGN PATENT DOCUMENTS

| CN | 103078329 B | 8/2014 |
| CN | 106099891 A | 11/2016 |
| CN | 108879769 A | 11/2018 |

(Continued)

OTHER PUBLICATIONS

Voight, Richard William, "Submarine High Voltage Power Transmission: Challenges and Opportunities", OTC-24448-MS, Offshore Technology Conference, Oct. 2013 (12 pages).

(Continued)

*Primary Examiner* — Tremesha W Burns
(74) *Attorney, Agent, or Firm* — Osha Bergman Watanabe & Burton LLP

(57) ABSTRACT

An submarine cable system includes a first and a second submarine cable circuit branches arranged in parallel between an onshore BSP and an offshore BSP, and a first and a second bus reactor circuits arranged in parallel and connected to the onshore BSP. The first and second submarine cable circuit branches each includes a first circuit breaker, a submarine cable circuit, and a second circuit breaker connected in series, a first line reactor of which one end is grounded and another end is connected between the submarine cable circuit and the first circuit breaker, and a second line reactor of which one end is grounded and another end is connected between the submarine cable circuit and the second circuit breaker. The first and second bus reactor circuits each includes a bus reactor and a circuit breaker connected in series. An example switching method for this system is also disclosed.

13 Claims, 6 Drawing Sheets

(56) References Cited

U.S. PATENT DOCUMENTS

2021/0098143 A1 4/2021 Trojer et al.
2022/0081091 A1 3/2022 Janik et al.

FOREIGN PATENT DOCUMENTS

| CN | 110138002 A | 8/2019 |
| CN | 214798556 U | 11/2021 |
| EP | 3220503 B1 | 11/2019 |
| RU | 1814141 C | 5/1993 |
| RU | 2318280 C2 | 2/2008 |
| WO | 2013087700 A1 | 6/2013 |
| WO | 2016017146 A1 | 2/2016 |

OTHER PUBLICATIONS

International Search Report and Written Opinion of the International Searching Authority issued in corresponding International Application No. PCT/US2020/049847, mailed on May 11, 2021 (83 pages).

Marten, Anne-Katrin et al., "Kriegers Flak-Combined Grid Solution: Coordinated Cross-Border Control of a Meshed HVAC/HVDC Offshore Wind Power Grid", IET Renewable Power Generation, The Institution of Engineering and Technology, Michael Faraday House, Six Hills Way, Stevenage, Herts, SG1 2AY, UK, vol. 12, Issue 13, pp. 1493-1499, Mar. 23, 2018 (7 pages).

De Alegría, Iñigo Martinez et al., "Transmission Alternatives for Offshore Electrical Power", Renewable and Sustainable Energy Reviews, Elseviers Science, New York, NY, US, vol. 12, Issue 5, pp. 1027-1038, Jun. 2009 (12 pages).

SUBMARINE CABLE SYSTEM AND A SWITCHING METHOD THEREOF

BACKGROUND

Installing long high voltage (HV) submarine cables generates a high negative reactive power which need to be absorbed by shunt reactors (positive reactive power) at both sides of the submarine cables. For example, installing two 230 kV submarine cables that are 90 km long will generate a negative reactive power of about 400 MVARs. Energizing the submarine cables with full rate MVARs compensation runs the risk of a Gas Insulated Switchgear (GIS) exceeding a Transient Recovery Voltage (TRV) rating or having missing zero phenomenon during switching thereof.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of this invention, an example submarine cable system comprises: a first submarine cable circuit branch and a second submarine cable circuit branch arranged in parallel between an onshore BSP and an offshore BSP, the first and second submarine cable circuit branches each including a first circuit breaker, a submarine cable circuit, and a second circuit breaker connected in series, a first line reactor of which one end is grounded and another end is connected between the submarine cable circuit and the first circuit breaker, and a second line reactor of which one end is grounded and another end is connected between the submarine cable circuit and the second circuit breaker; and a first bus reactor circuit and a second bus reactor circuit arranged in parallel and connected to the onshore BSP, each including a bus reactor and a third circuit breaker connected in series.

In another aspect of this invention, an example switching method for this example submarine cable system comprises: determining a submarine cable circuit branch to be energized; determining a bus reactor related to the submarine cable circuit branch to be energized; adjusting tap position of the determined bus reactor to reduce a load of the determined bus reactor; adjusting tap positions of the first and second line reactors in the submarine cable circuit branch to be energized to reduce a load of each of the first and second line reactors; energizing the submarine cable circuit in the submarine cable circuit branch to be energized; and immediately after energizing the submarine cable circuit, readjusting the tap positions of the first and second line and the determined bus reactor in the energized submarine cable circuit branch such that voltage levels within the energized submarine cable circuits are acceptable.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
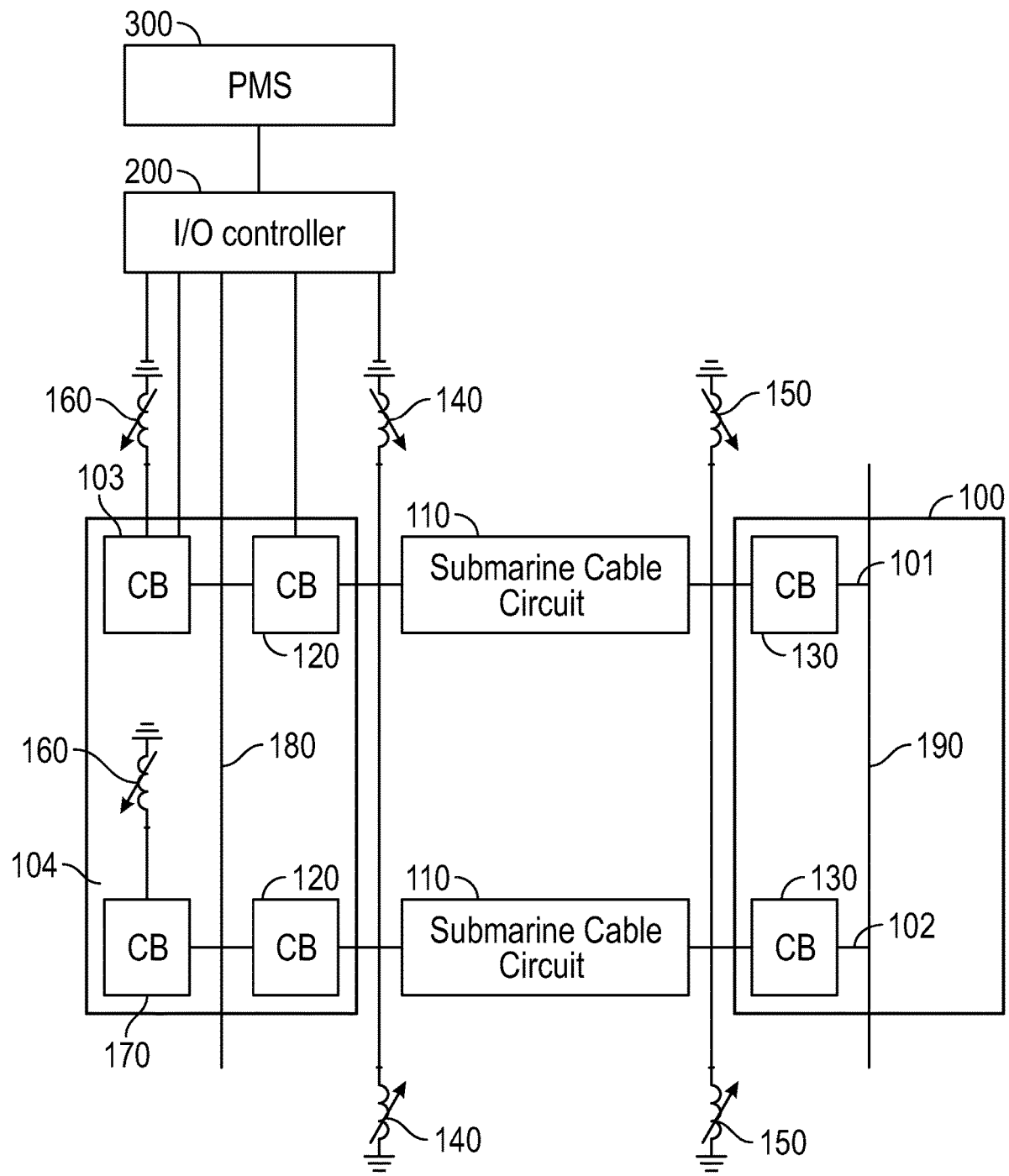
FIG. 1 shows a schematic diagram of a submarine cable system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a circuit breaker" includes reference to one or more of such circuit breakers.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a system and method for controlling shunt reactors to regulate the voltage on both sides of radial long submarine cables or Overhead Transmission Lines in all loading scenarios. Specifically, in one or more embodiments, a power management system (PMS) controller is added to a Power System Automation (PSA) system that takes input from the PSA internet and controls the tap changers of a plurality of shunt reactors to regulate the voltage or power factor on both sides of the submarine cables dynamically, i.e., constantly for all loading conditions of the system. Further, the PMS controller is redundant, with one controller installed on one side of the submarine cables taking the load, and another controller located on the other end of the submarine cables in hot standby mode.

Advantageously, embodiments disclose herein provide a system and method that makes safe energization to the highly compensated long HV submarine cables possible without jeopardizing the Gas Insulated Switchgear (GIS) integrity due to the missing zero phenomena in the AC current wave for the first two seconds of the submarine cable energization. The GIS includes the bus and breakers on one side of the submarine cable. More specifically, the onshore circuit breaker feeding the submarine cable is known as the GIS.

Figure 4:
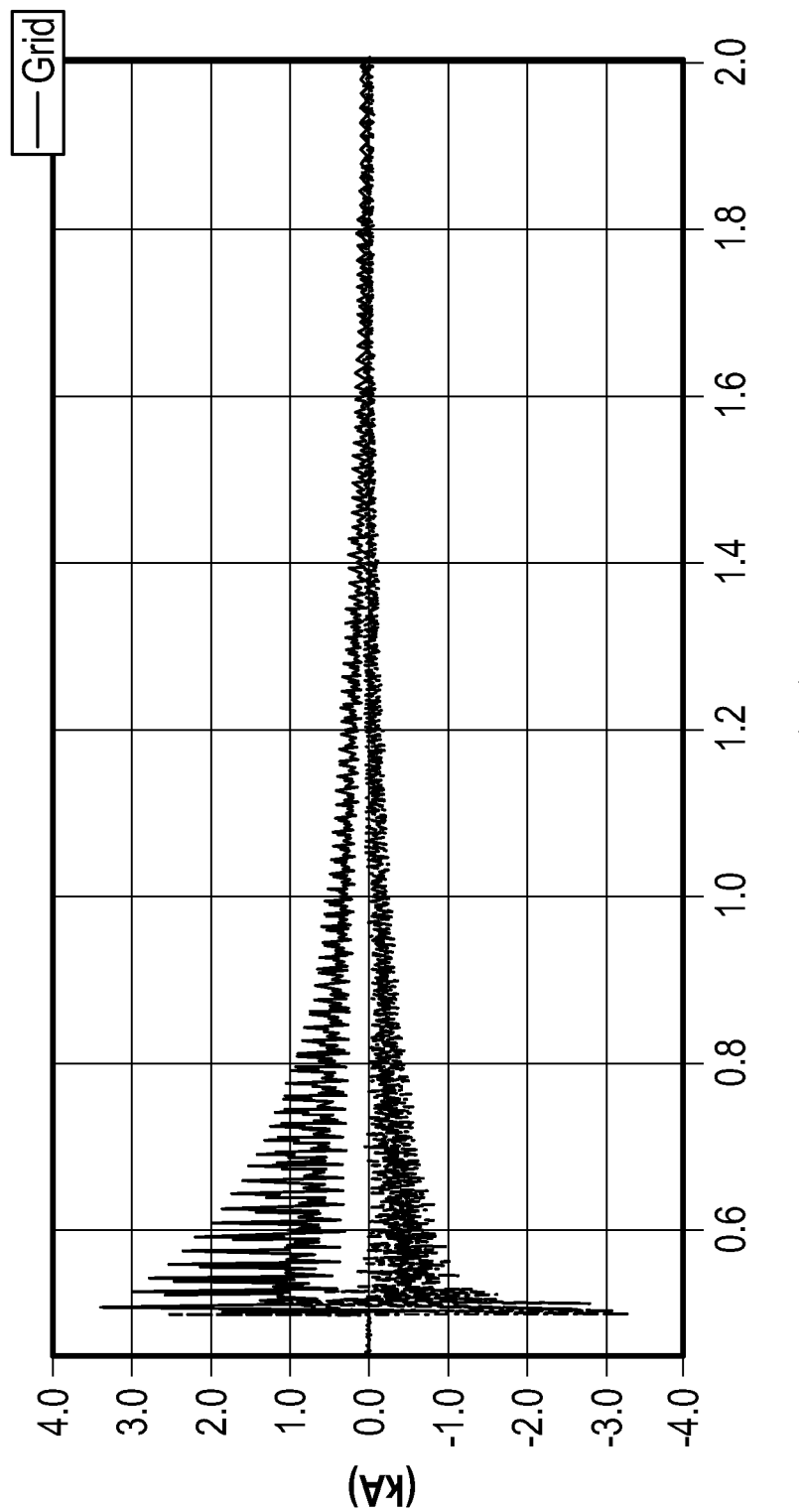
FIG. 4 shows a missing zero phenomena for the first one to two seconds.

Installing long HV submarine cables such as two 90 km 230 kV submarine cables generates around negative 400 MVARs which need to be absorbed by shunt reactors (positive MVArs) at both sides of the submarine cables. Also, these submarine cables cannot be energized without these shunt reactors. However, the submarine cable with full tap position shunt reactors have low impedance during energization which causes high DC components, and hence results in missing the zero crossing for approximately two seconds, jeopardizing the 230 kV GIS if tripped during these two seconds after energization. This missing zero phenomena is shown in FIG. 4. To address this issue, embodiments disclosed herein utilize the PMS to perform sequential switching by: fully reducing the shunt reactors compensation before energization to reduce the MVARs compensation to acceptable limit for the GIS, energizing the submarine cable, and adjusting the shunt reactors compensation at both sides of the submarine cable to the acceptable voltage limit.

FIG. 1 shows a schematic diagram illustrating a submarine cable system 100. As shown in FIG. 1, the system 100 includes a first submarine cable circuit branch 101 and a second submarine cable circuit branch 102 arranged in parallel between an onshore Bulk Supply Point (BSP) 180 and an offshore BSP 190. The onshore BSP 180 may be a combination of equipment configured for receiving and distributing power from a power grid for energizing the submarine cable and the offshore BSP 190 may be a combination of equipment configured for receiving and distributing the powers from the submarine cable.

The first and second submarine cable circuit branches each include a first circuit breaker (CB) 120, a submarine cable circuit 110, and a second circuit breaker 130 connected in series, a first line reactor 140 and a second line reactor 150. One end of the first line reactor 140 is grounded and the other end of the first line reactor 140 is connected between the submarine cable circuit 110 and the first circuit breaker 120. One end of the second line reactor 150 is grounded and the other end of the second line reactor 150 is connected between the submarine cable circuit 110 and the second circuit breaker 130.

The system 100 further includes a first bus reactor circuit 103 and a second bus reactor circuit 104 arranged in parallel and connected to the onshore BSP 180. The first bus reactor circuit 103 and the second bus reactor circuit 104 each include a grounded bus reactor 160 and a third circuit breaker 170 connected in series. In one or more embodiments, the system 100 also includes a Power Management System (PMS) 300 connected to an I/O controller 200.

The circuit breakers are electrical safety devices designed to protect the submarine cable circuit from damage caused by an overcurrent or short circuit and can be reset (either manually or automatically) to resume normal operation. The reactors can be variable shunt reactors configured to adapt upon receiving immediate feedback or control instructions from the PMS. Shunt reactors (SRs) are used in high voltage energy transmission systems to control the voltage or power factor during load variations. Depending on the voltage requirement needs, shunt reactors are switched on/off or reduced/increased tap changer position to provide reactive power compensation. With increasing load variations, variable shunt reactors (VSR) are developed as a means to provide more controllability for grid operators in reactive power management by continuously adjusting the compensation according to the load variation. This technology uses a tap changer, of the same type used in power transformers, to vary the inductance by changing the number of electrical turns in the reactor windings.

In some embodiments, the reactors may be defined as a set of numerous identical capacitors which are connected either in parallel or series inside an enclosure and are utilized for the correction of power factor as well as protection of submarine cable circuit. The submarine cable circuit may be a combination of equipment configured for receiving power from the onshore BSP 180 and delivering processed power to the offshore BSP 190. In some embodiments, the submarine cable circuit may further include or connect to one or more loads which may be electric equipment used in oil and gas applications. In some embodiments, the PMS 300 controls a compensating voltage of the variable reactors to meet any reactive power requirements resulting from running cables over long distances.

The I/O controller 200 is connected to the first and second circuit breakers 120 and the first line reactor 140 and second line reactor 150 of the first submarine cable circuit branch 101, the bus reactor 160 and the third circuit breaker 170 of the first bus reactor circuit 103, and the onshore BSP 180. The I/O controller 200 may be an interface device that sends and receives, under the control of the PMS 300, control and status signals to/from the onshore BSP, the circuit breakers and/or the reactors.

Figure 2:
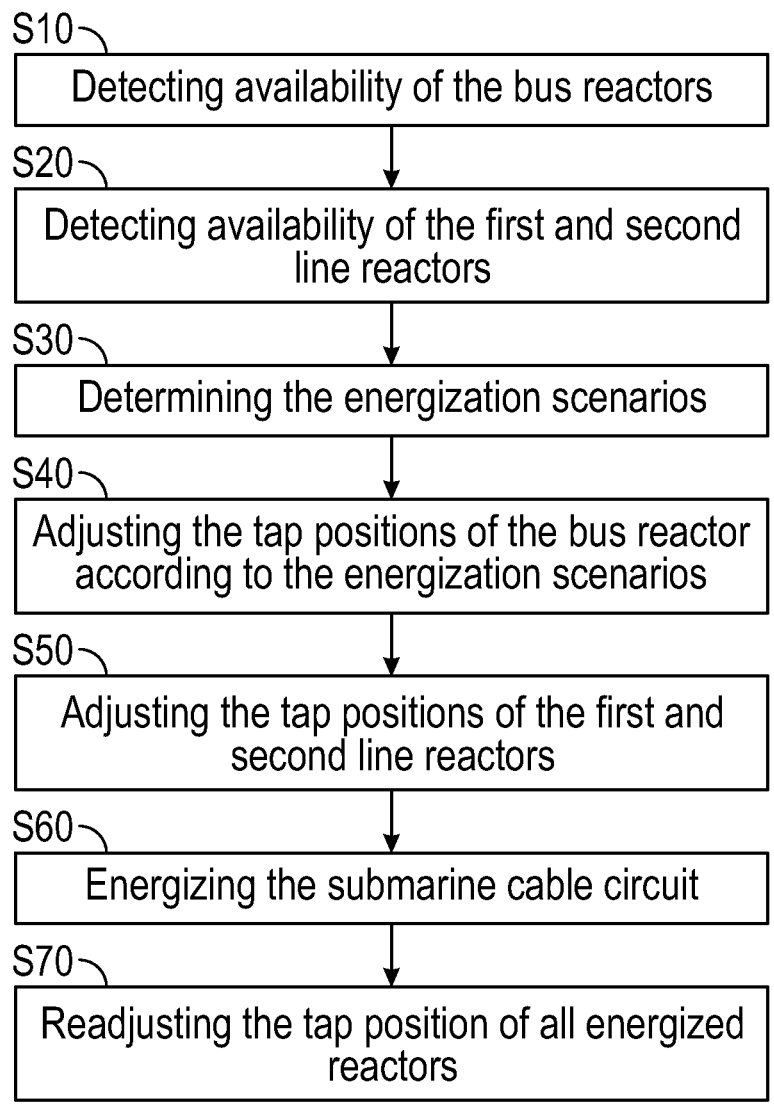
FIG. 2 shows a flowchart in accordance with one or more embodiments.

FIG. 2 shows a flowchart in accordance with one or more embodiments. As shown in FIG. 2, according to a method performed by the PMS, initially in step S10, availability of bus shunt reactors is determined for each submarine cable that is planned to be energized. That is, it is determined how many of the bus reactors are already energized. The availability of a bus reactor is detected by detecting the status of the circuit breaker disconnection of the bus reactor by an I/O controller or the PMS. If no bus reactor is available, then the method ends.

Next, in step S20, availability of the first and second line reactors in each and every branch is determined. The availability of a line reactor is detected by detecting the status of the circuit breaker disconnection of the line reactor by the I/O controller or the PMS. If one of the line reactors is not available, energization of the submarine cable circuits whose line reactor is not available is blocked. According to one embodiment, if one of the line reactors is not available, the submarine cable circuits of the submarine cable circuit branches in which the unavailable line reactor is located is blocked. In addition, if one of the line reactors is not available, a warning procedure may be initiated by which engineers or the owner may be urged to inspect the lines. If a line reactor is available, it is ready for energization. If each and every one of the submarine cable circuit branches includes at least one unavailable line reactor, the method ends.

When all of the line reactors and bus reactors are available, or when both of the line reactors in one submarine cable circuit branch and at least one bus reactor are available, then, in step S30, energization scenarios will be determined. In one or more embodiments, there are two possible energization scenarios. The first scenario is that no submarine cable circuit (submarine cable circuit branch) is energized, in which case the first submarine cable circuit is selected to be energized. In the second scenario, one submarine cable circuit is already energized, and the other submarine cable circuit (submarine cable circuit branch) requires energization.

Then, in step S40, the bus reactors are adjusted based on the above described two scenarios. In the first scenario, both bus reactors are deemed as related to the submarine cable circuit branch to be energized and the tap positions of both bus reactors are adjusted to minimum or for minimum compensation. In the second scenario, one bus reactor will be assigned for and deemed as related to the submarine cable circuit branches to be energized. That is, the tap position of the assigned one shunt reactor will be adjusted for minimum compensation as well as the line reactors connected to the cable circuit being energized. Tap position of the bus shunt reactor is adjusted to reduce a load of the bus shunt reactors. Then, in step S50, tap positions of the first and second line reactors in each submarine cable circuit branch to be energized are adjusted at both sides of the submarine cable to reduce a load of each of the first and second line reactors. In one embodiment, the adjustment of the tap positions of the bus reactors in the first and second bus reactor circuits and the adjustment of the tap positions of the first and second line reactors are done such that the tap position of the line shunt reactors at both side of the submarine cable circuit that will be energized is reduced to minimum. For example, up to 40% of a full load of each of the bus reactors and the first and second line reactors is reduced.

In step S60, the submarine cable circuits of the first and second submarine cable circuit branches are energized, that is, the power from the onshore BSP 180 is provided to the first and second submarine cable circuits. In one or more embodiments, the submarine cable circuits are energized by closing the GIS breaker. Instructions to close the GIS breaker are sent to the GIS breaker via the I/O controllers.

Then in step S70, immediately after the submarine cable circuits are energized, the tap position of all energized reactors are readjusted to adjust the voltage at both sides of the submarine cable. In one or more embodiments, the tap positions of the first and second line reactors are readjusted such that voltage levels within the submarine cable circuits are acceptable. In one embodiment, the tap positions of the first and second line reactors is readjusted within 1.5 seconds after the submarine cable circuits are energized. The bus reactors would be readjusted in a similar way. By readjusting the tap positions of the first and second line and bus reactors immediately after energizing the submarine cable circuits, voltage levels on the onshore and offshore BSPs as well as within the submarine cable circuits are acceptable.

In one or more embodiments, the flowchart of FIG. 2 is performed in the order shown to provide automated sequential switching to allow successful energization of the 230 kV long submarine cable while the shunt reactors are connected.

Figure 3:
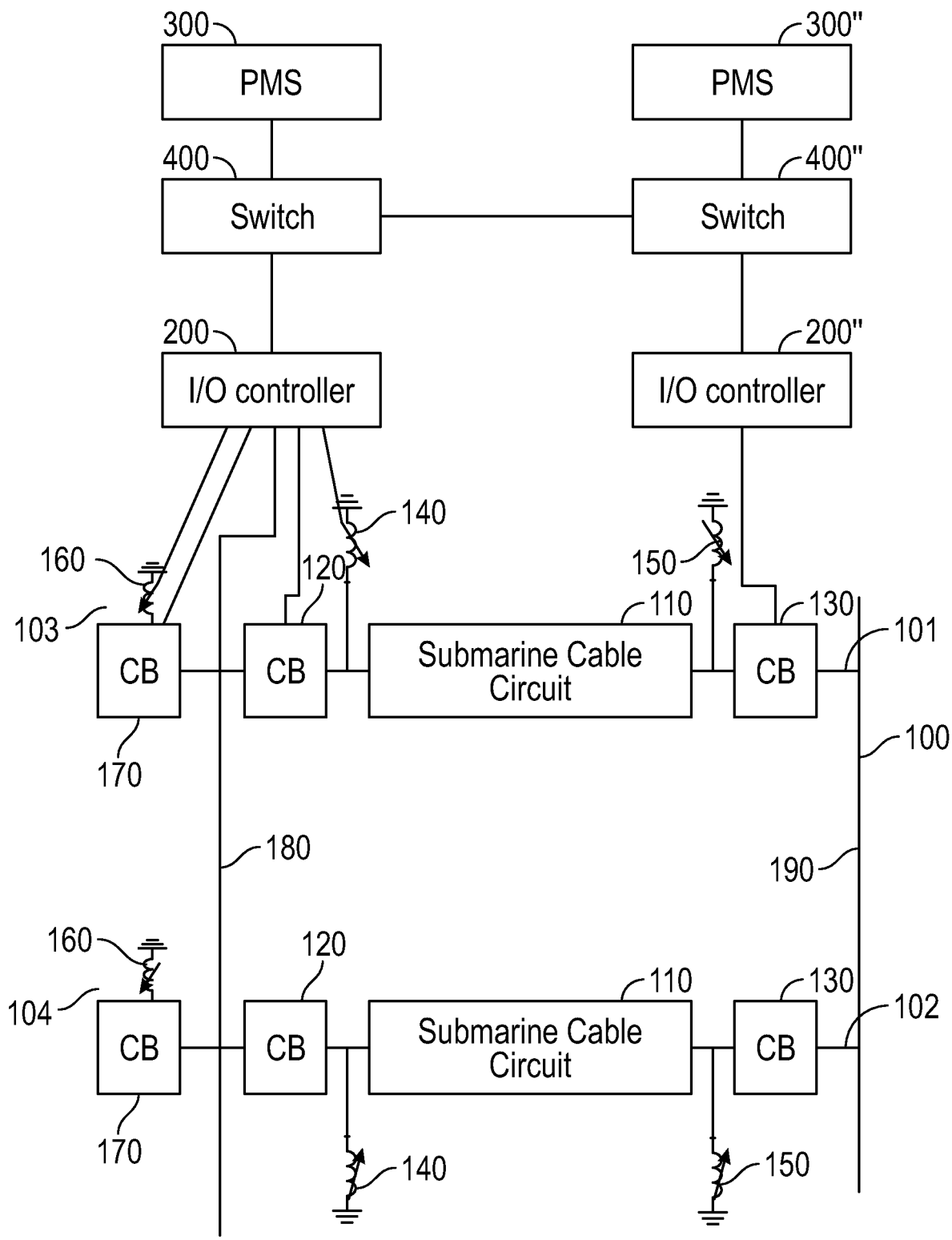
FIG. 3 shows another schematic diagram of a submarine cable system in accordance with one or more embodiments.

FIG. 3 shows a schematic diagram of a submarine cable system in accordance with one or more embodiments. As shown in FIG. 3, compared to the system shown in FIG. 1, the PMS 300 is connected to the I/O controller 200 via a first switch 400, and the system 100 further comprises a second switch 400" and a standby PMS 300". The first switch 400 is connected to the second switch 400", for example, via a cable, and the second switch 400" is connected to a standby PMS 300". The PMS 300 is onshore and the standby PMS 300" is offshore. The second switch 400" is connected to a second I/O controller 200", and the second I/O controller 200" is connected to the second circuit breaker 130 of the first submarine cable circuit branch 101. In one embodiment, the second I/O controller 200" is also connected to the second circuit breaker 130 of the second submarine cable circuit branch 101.

In this embodiment, two PMS s are configured for automating the process of energizing the system. One PMS may be a primary PMS used for controlling the entire system, while an additional PMS may be a secondary PMS used as a redundant, hot standby for the primary PMS when, for example, the primary PMS is disconnected for maintenance or experiences a failure in operation. Further, in the event of a system disturbance, either PMS may assume control of the entirety of the system. In the example shown, the onshore PMS 300 is used as the primary PMS and the offshore PMS 300" is used as the secondary PMS. In another embodiment, the offshore PMS 300" may be used as the primary PMS and the onshore PMS 300 may be used as the secondary PMS.

In one or more embodiments, as part of the process of FIG. 2 (in the background), the primary PMS and redundant PMS controllers are constantly communicating with each other to determine whether there is any failure of the primary PMS. Once the primary (main) PMS has any failure, an alarm or alert is sent to the redundant PMS controller. The primary PMS controller automatically stops controlling and the redundant PMS controller takes the lead automatically. Thus, in one or more embodiments, in case the primary PMS fails, the primary PMS 300 can be switched to the hot standby secondary/redundant PMS 300".

FIG. 4 shows a missing zero phenomena for the first one to two seconds of energization of the submarine cables when the shunt reactors are in full tap positions. The maximum length of an high voltage underground cable (HV UGC) cable is often constrained by the criterion that the cable cannot have more than 50% reactive power compensation. If this limit is exceeded the current in the circuit breaker may not have a zero crossing after energization, which is referred to as the zero missing phenomenon. This is problematic if a fault occur shortly after energization. As shown in FIG. 4, when the submarine cable is energized with full tap positions of shunt reactors, the zero crossing is missing for approximate two seconds, which may jeopardize the 230 kV GIS if tripped during these two seconds after energization.

Figure 5:
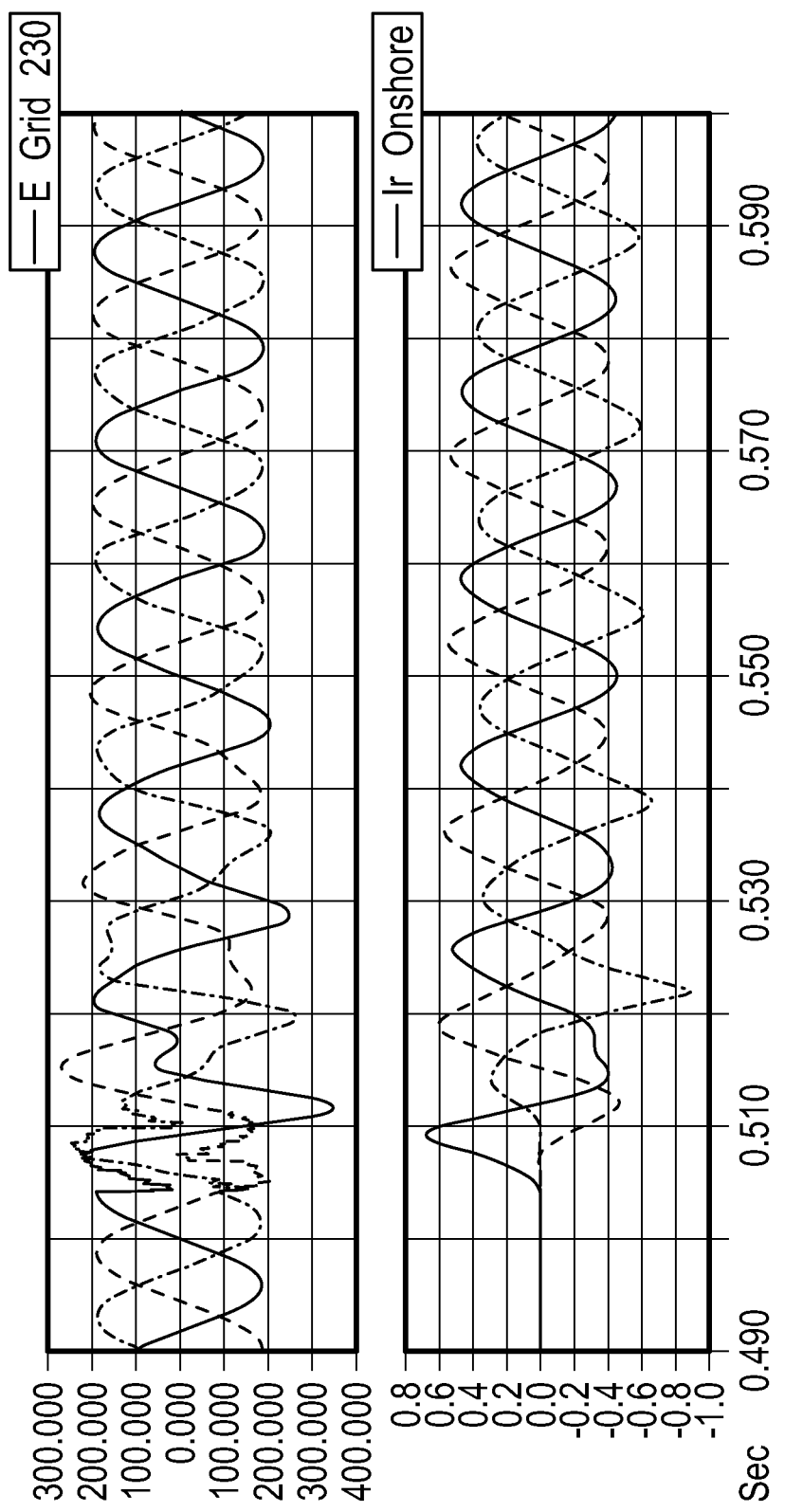
FIG. 5 shows schematically a technical effect of one or more embodiments.

FIG. 5 shows schematically a technical effect of one or more embodiments. From the upper section of FIG. 5, it can be seen that the missing zero crossing has been overcome by using some embodiments of this invention. More specifically, in FIG. 5, the upper graph shows the voltage. The graph shows three phases. As can be seen from the graph, a disturbance occurs at the moment of closing the breaker to energize. The lower graph shows the current after energization, again with three phases. As can be seen from the lower graph, there is zero crossing of the current value for every cycle of every phase. The Ir shown in FIG. 5 represents the current of onshore breaker 120, while the E Grid 230 shown is the voltage profile for the onshore GIS. As there is a zero crossing of the current value for every cycle in FIG. 5, there will be no arcing inside the circuit breaker 120 if it opens immediately after closing.

Embodiments disclosed herein may be implemented using virtually any type of computing system, regardless of the platform being used. In some embodiments, one or more modules of the PMS may be computer systems located at a remote location. In some embodiments, the PMS may be fully implemented in a computer system. In some embodiments, the computing system may be implemented on remote or handheld devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 6:
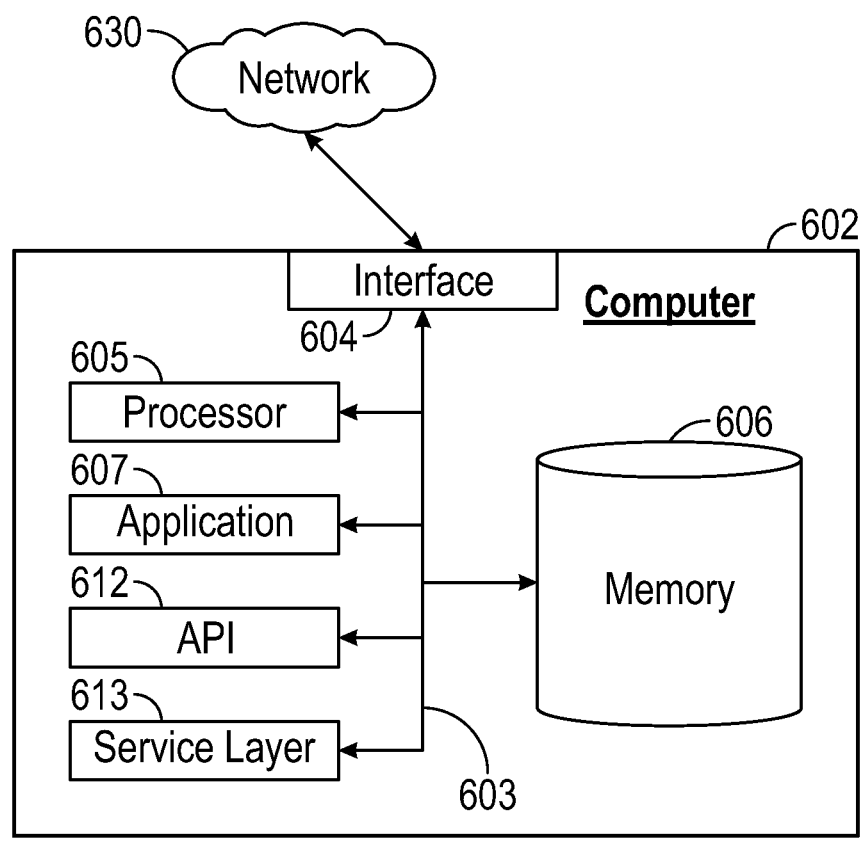
FIG. 6 shows a computer system in accordance with one or more embodiments.

FIG. 6 depicts a block diagram of a computer system 602 used to provide computational functionalities associated with described algorithms, methods, functions, processes, flows, and procedures as described in this disclosure, according to one or more embodiments. For example, the computer system 602, and the processor of the computer system, may be used to perform one or more steps of the flowchart (calculations, determinations, etc.) in FIG. 2. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 602 may include a computer that includes an input device, such as a keypad, keyboard, touch screen, or other device that can accept user information, and an output device that conveys information associated with the operation of the computer 602, including digital data, visual, or audio information (or a combination of information), or a GUI.

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, business intelligence (BI) server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613. The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or another suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630. Generally, the interface 604 includes logic encoded in software or hardware (or a combination of software and hardware) and operable to communicate with the network 630. More specifically, the interface 604 may include software supporting one or more communication protocols associated with communications such that the network 630 or interface's hardware is operable to communicate physical signals within and outside of the illustrated computer 602.

The computer 602 includes at least one computer processor 605. Although illustrated as a single computer processor 605 in FIG. 6, two or more processors may be used according to particular needs, desires, or particular implementations of the computer 602. Generally, the computer processor 605 executes instructions and manipulates data to perform the operations of the computer 602 and any machine learning networks, algorithms, methods, functions, processes, flows, and procedures as described in the instant disclosure.

The computer 602 also includes a memory 606 that holds data for the computer 602 or other components (or a combination of both) that can be connected to the network 630. For example, memory 606 can be a database storing data consistent with this disclosure. Although illustrated as a single memory 606 in FIG. 6, two or more memories may be used according to particular needs, desires, or particular implementations of the computer 602 and the described functionality. While memory 606 is illustrated as an integral component of the computer 602, in alternative implementations, memory 606 can be external to the computer 602.

The application 607 is an algorithmic software engine providing functionality according to particular needs, desires, or particular implementations of the computer 602, particularly with respect to functionality described in this disclosure. For example, application 607 can serve as one or more components, modules, applications, etc. Further, although illustrated as a single application 607, the application 607 may be implemented as multiple applications 607 on the computer 602. In addition, although illustrated as integral to the computer 602, in alternative implementations, the application 607 can be external to the computer 602.

There may be any number of computers 602 associated with, or external to, a computer system containing a computer 602, wherein each computer 602 communicates over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

While FIGS. 1 and 3 show various configurations of components, other configurations may be used without departing from the scope of the disclosure. For example, various components in FIGS. 1 and 3 may be combined to create a single component. As another example, the functionality performed by a single component may be performed by two or more components.

The same principles disclosed herein may be applied to another submarine cable starting from offshore BSP (190), to another offshore BSP, and so on. In this situation, the offshore BSP (190) may be deemed as an onshore BSP.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A switching method for a system, the system comprising: a first submarine cable circuit branch and a second submarine cable circuit branch arranged in parallel between an onshore Bulk Supply Point (BSP) and an offshore BSP, the first and second submarine cable circuit branches each including a first circuit breaker, a submarine cable circuit, and a second circuit breaker connected in series, a first line reactor of which one end is grounded and another end is connected between the submarine cable circuit and the first circuit breaker, and a second line reactor of which one end is grounded and another end is connected between the submarine cable circuit and the second circuit breaker; and a first bus reactor circuit and a second bus reactor circuit arranged in parallel and connected to the onshore BSP, each including a bus reactor and a third circuit breaker connected in series, the method comprising:
  determining a submarine cable circuit branch to be energized;
  determining a bus reactor related to the submarine cable circuit branch to be energized;
  adjusting tap position of the determined bus reactor to reduce a load of the determined bus reactor;
  adjusting tap positions of the first and second line reactors in the submarine cable circuit branch to be energized to reduce a load of each of the first and second line reactors;
  energizing the submarine cable circuit in the submarine cable circuit branch to be energized; and
  immediately after energizing the submarine cable circuit, readjusting the tap positions of the first and second line and the determined bus reactor in the energized submarine cable circuit branch such that voltage levels within the energized submarine cable circuits are acceptable.

2. The method according to claim 1, wherein readjusting the tap positions of the first and second line reactors is done within 1.5 seconds after the submarine cable circuits are energized.

3. The method according to claim 1, wherein adjusting tap positions of the determined bus reactor and adjusting tap positions of the first and second line reactors is done such that voltage levels on the onshore and offshore BSPs as well as within the submarine cable circuits are acceptable.

4. The method according to claim 1, wherein determining a submarine cable circuit branch to be energized comprises determining a first energization scenario and a second energization scenario, wherein the first energization scenario is that none of the submarine cable circuits is energized, requiring energization of one of the submarine cable circuits, and wherein the second energization scenario is that one of the submarine cable circuits has already been energized and the other submarine cable circuit needs to be energized.

5. The method according to claim 4,
  wherein, in response to determining the first scenario, the tap positions of both bus reactors are determined to be related to the submarine cable circuit branch to be energized, and is adjusted for minimum compensation, and
  wherein, in response to determining the second scenario, only one of the bus reactors is assigned for and determined as related to the submarine cable circuit branch to be energized and the tap position of the assigned bus reactor is adjusted for minimum compensation.

6. The method according to claim 1, the method further comprising detecting availability of the first and second line reactors, wherein the method is performed by an onshore Power Management System (PMS).

7. The method according to claim 6, further comprising determining, based on a predetermined criterion, whether the onshore PMS has a failure; and
  switching the onshore PMS to a hot standby offshore, PMS in case the onshore PMS has a failure.

8. A non-transitory computer readable medium storing instructions executable by a computer processor, the instructions comprising functionality for configuring at least one Power Management System (PMS) to perform a method comprising:
  determining a submarine cable circuit branch to be energized;

determining a bus reactor related to the submarine cable circuit branch to be energized;

adjusting tap position of the determined bus reactor to reduce a load of the determined bus reactor;

adjusting tap positions of the first and second line reactors in the submarine cable circuit branch to be energized to reduce a load of each of the first and second line reactors;

energizing the submarine cable circuit in the submarine cable circuit branch to be energized; and immediately after energizing the submarine cable circuit, readjusting the tap positions of the first and second line and the determined bus reactor in the energized submarine cable circuit branch such that voltage levels within the energized submarine cable circuits are acceptable.

9. The non-transitory computer readable medium storing instructions executable by the computer processor according to claim 8, the instructions comprising functionality for configuring at least one Power Management System (PMS) to perform the determining a submarine cable circuit branch to be energized, wherein the determining a submarine cable circuit branch to be energized comprises determining a first energization scenario and a second energization scenario, wherein the first energization scenario is that none of the submarine cable circuits is energized, requiring energization of one of the submarine cable circuits, and wherein the second energization scenario is that one of the submarine cable circuits has already been energized and the other submarine cable circuit needs to be energized.

10. The non-transitory computer readable medium storing instructions executable by the computer processor according to claim 8, the instructions comprising functionality for configuring at least one Power Management System (PMS) to perform readjusting the tap positions of the first and second line reactors, wherein readjusting the tap positions of the first and second line reactors is done within 1.5 seconds after the submarine cable circuits are energized.

11. The non-transitory computer readable medium storing instructions executable by the computer processor according to claim 8, the instructions comprising functionality for configuring at least one Power Management System (PMS) to perform adjusting tap positions of the determined bus reactor and adjusting tap positions of the first and second line reactors, wherein adjusting tap positions of the determined bus reactor and adjusting tap positions of the first and second line reactors is done such that voltage levels on the onshore and offshore BSPs as well as within the submarine cable circuits are acceptable.

12. The non-transitory computer readable medium storing instructions executable by the computer processor according to claim 8, the instructions comprising functionality for configuring at least one Power Management System (PMS) to perform the method further comprising detecting availability of the first and second line reactors, wherein the method is performed by an onshore Power Management System (PMS).

13. The non-transitory computer readable medium storing instructions executable by the computer processor according to claim 12, the instructions comprising functionality for configuring at least one Power Management System (PMS) to perform the method further comprising:

determining, based on a predetermined criterion, whether the onshore PMS has a failure; and switching the onshore PMS to a hot standby offshore PMS in case the onshore PMS has a failure.

* * * * *